US011037341B1

(12) United States Patent
Gori et al.

(10) Patent No.: US 11,037,341 B1
(45) Date of Patent: Jun. 15, 2021

(54) GENERATIVE SHAPE CREATION AND EDITING

(71) Applicant: Adobe Inc., San Jose, CA (US)

(72) Inventors: Giorgio Gori, San Jose, CA (US); Tamy Boubekeur, Paris (FR); Radomir Mech, Mountain View, CA (US); Nathan Aaron Carr, San Jose, CA (US); Matheus Abrantes Gadelha, Amherst, MA (US); Duygu Ceylan Aksit, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/744,105

(22) Filed: Jan. 15, 2020

(51) Int. Cl.
*G06T 11/20* (2006.01)
*G06N 20/00* (2019.01)
*G06N 7/00* (2006.01)
*G06T 9/00* (2006.01)

(52) U.S. Cl.
CPC ............ *G06T 11/203* (2013.01); *G06N 7/005* (2013.01); *G06N 20/00* (2019.01); *G06T 9/00* (2013.01); *G06T 2200/24* (2013.01)

(58) Field of Classification Search
CPC ........... G06T 11/23; G06T 9/00; G06N 20/00; G06N 7/005
USPC .......................................................... 345/441
See application file for complete search history.

(56) References Cited

U.S. PATENT DOCUMENTS

2017/0039739 A1* 2/2017 Doran ....................... G06T 1/20
2018/0253869 A1* 9/2018 Yumer .................... G06F 30/00
2019/0318261 A1* 10/2019 Deng ..................... G06N 20/00

OTHER PUBLICATIONS

Tulsiani,"Learning Shape Abstractions by Assembling Volumetric Primitives", Aug. 2, 2018, Year (2018), CVPR 17 pages, IDS received on Jan. 16, 2020.*

Gal,"iWires: An Analyze-and-Edit Approach to Shape Manipulation", ACM Transactions Graphics, vol. 28, No. 3, Aug. 2009, 10 pages.

Gori,"FlowRep: Descriptive Curve Networks for Free-Form Design Shapes", Jul. 2017, 14 pages.

Paschalidou,"Superquadrics Revisited: Learning 3D Shape Parsing Beyond Cuboids", Apr. 22, 2019, 21 pages.

Thiery,"Sphere-Meshes: Shape Approximation using Spherical Quadric Error Metrics", Sep. 4, 2019, 11 pages.

Tulsiani,"Learning Shape Abstractions by Assembling Volumetric Primitives", Aug. 2, 2018, 17 pages.

Zhou,"Generalized Cylinder Decomposition", Nov. 4, 2015, 14 pages.

* cited by examiner

*Primary Examiner* — Hai Tao Sun
(74) *Attorney, Agent, or Firm* — FIG. 1 Patents

(57) ABSTRACT

Generative shape creation and editing is leveraged in a digital medium environment. An object editor system represents a set of training shapes as sets of visual elements known as "handles," and converts sets of handles into signed distance field (SDF) representations. A handle processor model is then trained using the SDF representations to enable the handle processor model to generate new shapes that reflect salient visual features of the training shapes. The trained handle processor model, for instance, generates new sets of handles based on salient visual features learned from the training handle set. Thus, utilizing the described techniques, accurate characterizations of a set of shapes can be learned and used to generate new shapes. Further, generated shapes can be edited and transformed in different ways.

20 Claims, 15 Drawing Sheets

1300

GENERATIVE SHAPE CREATION AND EDITING

BACKGROUND

Graphics editing systems are implemented to generate and edit visual objects, such as digital photographs, digital objects, animations, and so forth. Accordingly, some graphics editing systems enable visual object editing by representing complex shapes using compact and editable representations like cages, skeletons, primitives, curves and so on. While there are exist solutions for extracting such representations from existing shapes, learning a generative model for such representations for creating new shapes or editing existing shapes presents some particular challenges. Recent implementations have utilized deep generative models to learn distributions of "raw" shape representations like occupancy grids, point clouds, and meshes. However, such representations are typically not amenable to editing procedures and do not explicitly capture the structure of a shape.

Thus, while conventional graphics editing systems may provide ways to learn and represent shapes as part of visual object editing, such shapes are not easily edited and may misrepresent shape structure. As a result, shape editing using conventional graphics editing systems can be burdensome not only from a user perspective, but also on system resources. For instance, shapes generated by such systems may be inaccurate and thus force users to engage in numerous interactions with such systems to attempt to generate and edit a desired shape. Further, the limited ability to apply edits to a generated shape further exacerbates this problem. This not only presents an undesirable user experience, but wastes system resources (e.g., processor bandwidth, memory, network bandwidth, and so forth) utilized to respond to and apply user edits.

SUMMARY

Generative shape creation and editing is leveraged in a digital medium environment. For instance, to mitigate the challenge of inaccuracies and mischaracterization of shape structure experienced in typical graphics editing systems, the described object editor system represents a set of training shapes as sets of visual elements known as "handles," and converts sets of handles into signed distance field (SDF) representations. A handle processor model is then trained using the SDF representations to enable the handle processor model to generate new shapes that reflect salient visual features of the training shapes. The trained handle processor model, for instance, generates new sets of handles based on salient visual features learned from the training handle set. Thus, utilizing the described techniques, accurate characterizations of a set of shapes can be learned and used to generate new shapes. Further, generated shapes can be edited and transformed in different ways.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
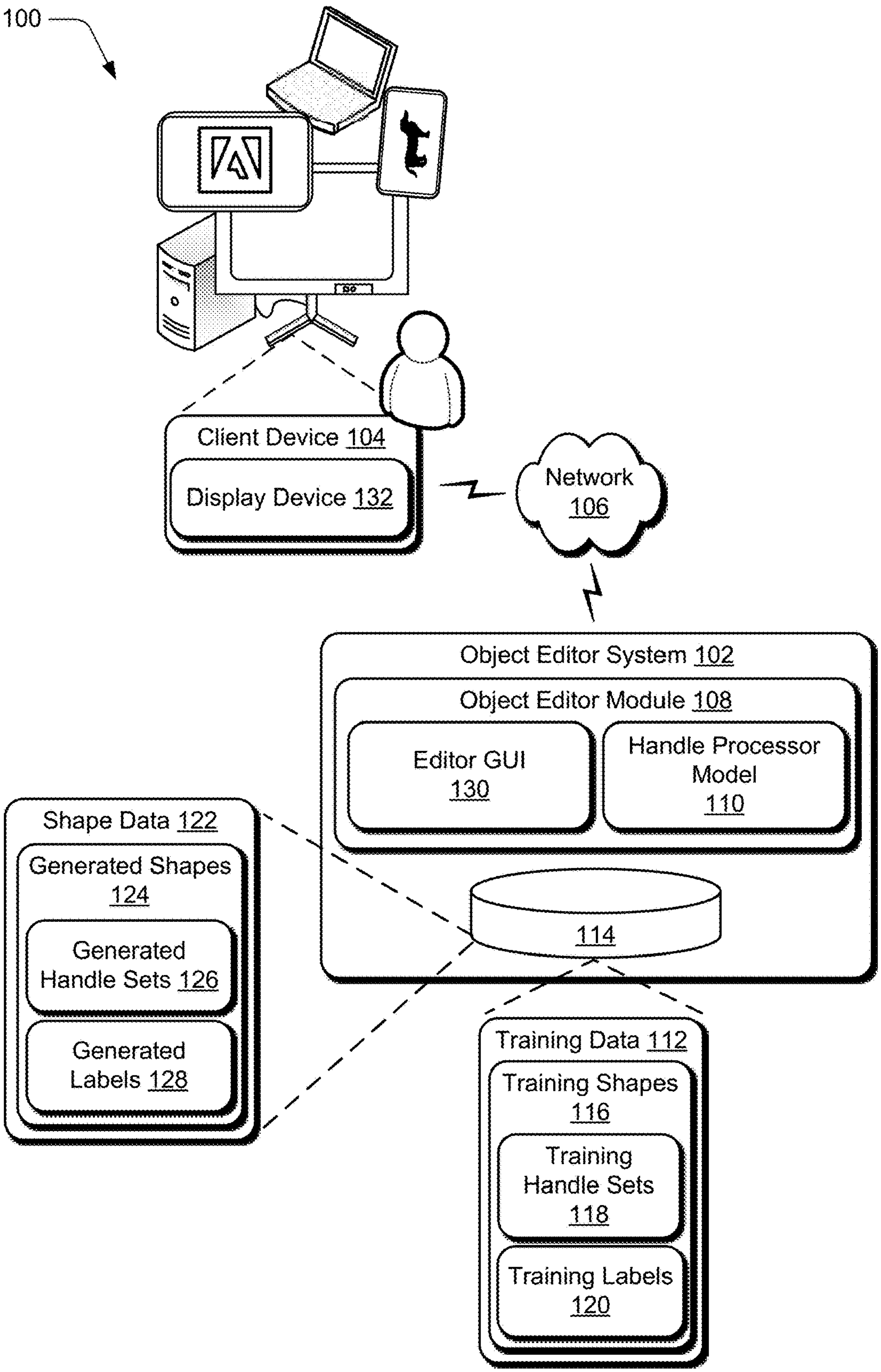
FIG. 1 is an illustration of an environment in an example implementation that is operable to employ techniques described herein.

To overcome the challenges to shape creation and editing presented in typical graphics editing systems, generative shape creation and editing is leveraged in a digital medium environment. For instance, to mitigate the challenge of inaccuracies and mischaracterization of shape structure experienced in typical graphics editing systems, the described object editor system represents a set of training shapes as sets of visual elements known as "handles," and converts sets of handles into signed distance field (SDF) representations. A handle processor model is then trained using the SDF representations to enable the handle processor model to generate new shapes that reflect salient visual features of the training shapes. The trained handle processor model, for instance, generates new sets of handles based on salient visual features learned from the training handle set. Thus, utilizing the described techniques, accurate characterizations of a set of shapes can be learned and used to generate new shapes. Further, generated shapes can be edited and transformed in different ways.

For instance, consider a scenario where a user selects a set of shapes, such as by selecting a pre-generated set of shapes. Each shape of the set of shapes is represented as a set of handles that each have a particular set of handle parameters. The handle parameters describe geometric attributes of each handle, such as handle size, handle center location, handle rotation, and so forth, relative to a respective shape. Each handle is then converted into an SDF representation by applying a signed distance function to handle parameters in a coarse regular grid. Generally, utilizing SDF representations of handle parameters provides for a more consistent shape representation than simple parametric representations. For instance, consider an example where a particular handle is a cuboid. In this example, there are multiple configurations (e.g., rotation values, scale values, and translation values) that describe the same object. However, an SDF representation will be the same regardless of the original handle parameters. This provides for more accuracy than conventional shape editing techniques, and makes training a model for shape generation significantly easier.

The SDF representations are then utilized to train an encoder of the handle processor model to generate a latent representation of the original shapes. In at least one implementation, the handle processor model represents a variational autoencoder (VAE) trained to reconstruct the input set of handles to generate the latent representation. Generally, the latent representation represents salient features of the original shapes in SDF form. A decoder of the handle processor model then decodes the latent representation to generate parametric representations of output shape handles that can be used for shape generation and editing. For instance, after the handle processor model is trained using SDF representations of training shapes, the model outputs parametric representations of new handle sets that can each be used to generate a new shape based on features represented in the latent representation. As further described below, different shape generation and editing tasks can be performed via manipulation of the latent representation, such as shape sampling, shape interpolation, shape completion, and so forth.

The described techniques further enable handle sets of different complexity to be generated, and for inaccurately predicted handles to be removed prior to generating a new shape. For instance, the handle processor model leverages a second decoder branch to predict an accuracy probability for each handle represented in the latent representation. Handle representations that do not meet an accuracy probability threshold can be removed prior to final shape generation, thus enabling more accurate representations of salient shape geometries learned from an original input set of shape handles.

Additionally, the described techniques support shape editing using multiple types of handles, such as handles that represent multiple different types of geometric primitives. For instance, individual handles in sets of handles that are input to the handle processor model are labeled with a handle type, such as "cuboid," "ellipsoid," and so forth. A loss function utilized by the handle processor model includes a "handle type" term that matches generated handle types with known handle types from the set of labeled handles. Generally, this enables more accurate representation and editing of handles generated by the model.

Accordingly, techniques for generative shape creation and editing overcome the deficiencies of traditional ways for shape generation and editing. For instance, by using SDF representations of visual elements that make up shapes, more accurate shape features can be learned and characterized than is provided by conventional systems. Further, by utilizing a separate decoder branch for accuracy prediction, inaccurately predicted handles can be filtered out to enable more accurate shape generation. In this way, accurate shape characterization and generation provided by the described techniques can be leveraged to reduce inaccuracies and resource wastage experienced in conventional graphics editing systems.

Term Descriptions

These term descriptions are provided for purposes of example only and are not intended to be construed as limiting on the scope of the claims.

As used herein, the term "shape" refers to a digital visual object with various visual and geometric attributes, such as size and orientation. Generally, a shape may be generated in various ways, such as based on a visual object taken from a digital photograph, a visual object created via an image editing system, a visual objected generated by an artificial intelligence technique, and so forth.

As used herein, the term "handle" refers to a visual element that makes up a portion of a shape. A handle, for instance, represents a visual structure with particular geometric and spatial attributes that contribute to the appearance of a shape. For example, an instance of shape is made up of a collection of handles that combine to give the shape its visual appearance and logical representation. Further, a particular handle can be described with reference to its visual parameters, such as size, orientation, distance from other handles, distance from a center and/or boundary of an image, and so forth.

As used herein, the term "signed distance field" ("SDF") refers to a data representation of a visual element (e.g., a handle) derived by mapping distances between points of a visual element. For instance, an SDF for a visual element can be generated by taking each pixel of the visual element and mapping a distance between the pixel and a particular point in the visual element, such as a boundary pixel for the visual element. In at least one implementation, an SDF for a visual element by applying a signed distance function to the visual element in a coarse grid, such as a grid with $8^3$ cells.

As used herein, the term "latent representation" represents data that is generated by an encoder based on input shapes (e.g., a set of training shapes), and that is decoded by a decoder to generate shapes, e.g., a set of new shapes. An encoder, for instance, represents a neural network that takes SDF representations of a set of handles and encodes a latent representation z that represents a compressed version of the input SDF representations. A decoder then takes the latent representation and decodes the latent representation to generate parameterized handles that attempt to reconstruct a set of training handles used to generate the latent representation. The parameterized handles can be used, for instance, to generate a new set of shapes.

As used herein, the term "generated shape" refers to a shape (e.g., a new collection of handles) that is generated based on a set of training shapes. A generated shape, for instance, is generated using a set of handles generated from a decoded latent representation. As further described below, a generated shape can be generated by applying different operations to a latent representation, such as sampling, interpolation, shape completion, and so forth.

In the following discussion, an example environment is first described that may employ the techniques described herein. Example systems and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ generative shape creation and editing as described herein. The illustrated environment 100 includes an object editor system 102 and a client device 104 that are communicatively coupled, one to another, via a network 106.

Computing devices that are usable to implement the object editor system 102 and the client device 104 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 14.

The object editor system 102 includes a visual object editor module 108 that is representative of functionality to process sets of handles that define different shapes and to enable shape-related tasks to be performed further to techniques for generative shape creation and editing described herein. Accordingly, the object editor module 108 leverages a handle processor model 110 that implements machine learning techniques to learn characteristics of shapes made of sets of handles, and to enable the characteristics to be leveraged to enable various shape-related tasks, such as shape creation, completion, and editing. Further, the object editor system 102 maintains training data 112 stored on a storage 114 and that can be leveraged to train the handle processor model 110 to perform that described tasks.

The training data 112 includes training shapes 116 that are each made up of training handle sets 118. The training shapes 116, for instance, represent a training data set of different visual objects, such as visual objects derived from digital drawings, digital photographs, digitized versions of analog images, and so forth. The training handle sets 118 represent sets of handles that each make up a respective training shape 116. Generally, a handle refers to a visual element that can be utilized to represent a portion of a shape. Thus, each training handle set 118 can represent a set of visual elements that combine to form a respective training shape 116. In at least some implementations, individual handles in the training handle sets 118 are tagged as handles, and may further be tagged as specific handle types. For instance, handles may be implemented as different geometric shapes (e.g., geometric primitives), and handles within the training handle sets 118 may be tagged as particular instances of geometric shapes. Thus, the training handle sets 118 include training labels 120 that label individual handles of the training handle sets 118 based on their respective type of geometric shape.

The object editor system 102 further includes shape data 122 stored on the storage 114. Generally, the shape data 122 represents data that can be utilized by and result from operation of the object editor module 108. The shape data 122 includes generated shapes 124, which include generated handle sets 126 and generated labels 128. The generated shapes 124 represent different outputs from the handle processor model 110, such as shapes that are generated, edited, and so forth, by the handle processor model 110. The generated handle sets 126 represent sets of handles that are generated based on output from the handle processor model 110 to create the generated shapes 124. The generated labels 128 represent labels that can be applied to individual handles of the generated handle sets 126. For instance, as mentioned above, handles may be implemented as different handle types, e.g., based on different geometric shapes. Accordingly, the generated labels 128 can identify handle types for individual instances of handles in the generated handle sets 126.

Further to the environment 100, the object editor module 108 includes an editor graphical user interface (GUI) 130 that is configured to enable user interaction with the object editor system 102. The editor GUI 130, for instance, is output via a display device 132 of the client device 104, and a user can interact with the object editor system 102 via interaction with the editor GUI 130. Further, output from the object editor module 108 can be displayed via the editor GUI 130 on the display device 132.

Having considered an example environment, consider now a discussion of some example details of the techniques for generative shape creation and editing in a digital medium environment in accordance with one or more implementations.

Implementation Details

Figure 2:
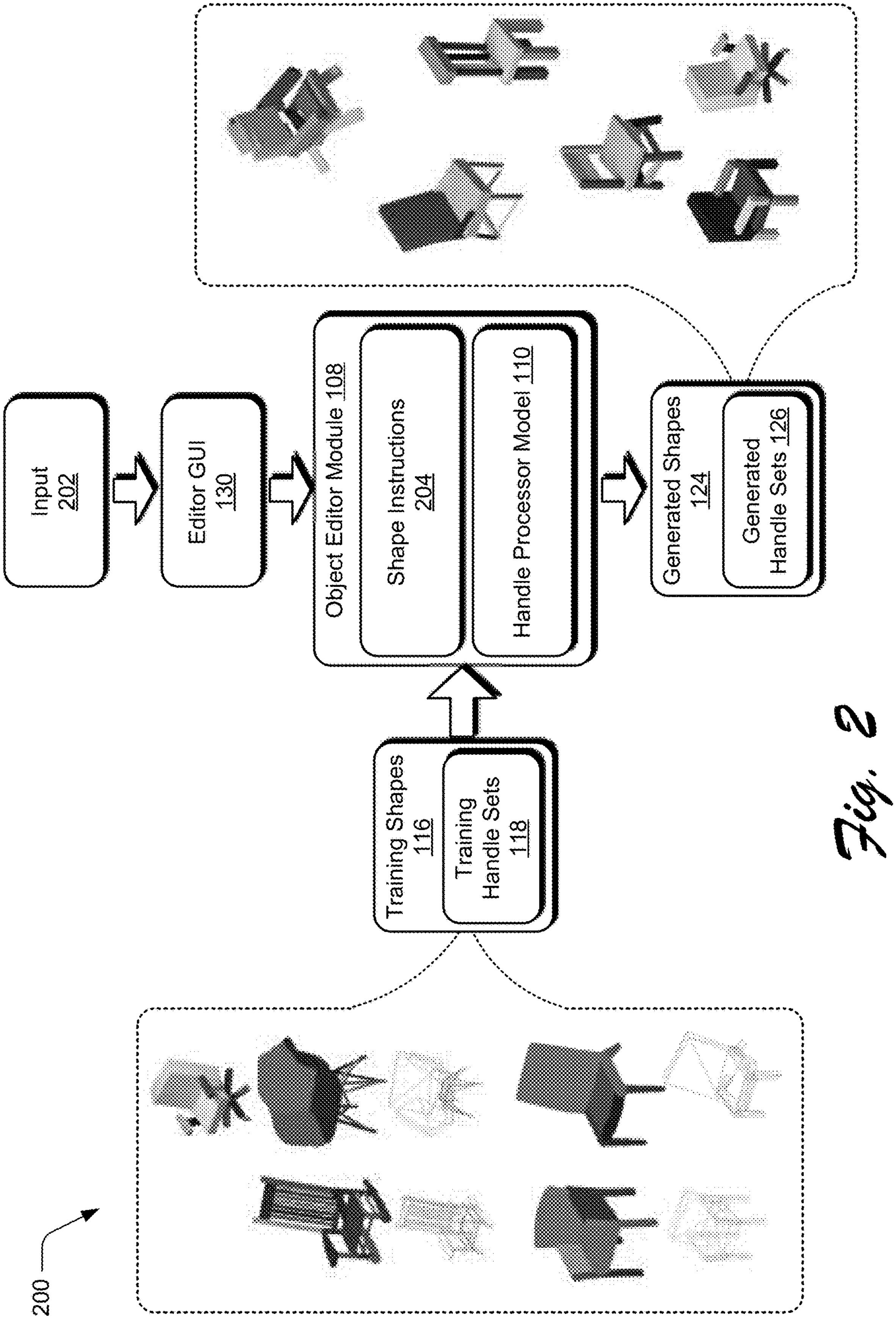
FIG. 2 depicts an example system that represents an overview of processes for generative shape creation and editing.

FIG. 2 depicts an example system 200 that represents an overview of processes for generative shape creation and editing in accordance with various implementations. More detailed discussions of individual aspects of the system 200 are presented after discussion of the system 200. In the system 200, the handle processor model 110 takes the training shapes 116 including the training handle sets 118 as input, processes the training shapes 116, and outputs the generated shapes 124. As mentioned above, the generated shapes 124 are composed of generated handle sets 126.

In at least some implementations, the generated shapes 124 are generated in response to user interaction with the editor GUI 130. For instance, a user provides user input 202 to the editor GUI 130 instructing the object editor module 108 to perform a shape task such as shape creation, shape completion, and/or shape editing. Accordingly, based on the user input 202, the object editor module 108 generates shape instructions 204 that describe a shape task and/or set of shape tasks to be performed. Thus, the generated shapes 124 may represent generated shapes, completed shapes, and/or edited shapes that are generated utilizing processing performed by the handle processor model 110. Further details of such processing are now discussed.

Figure 3A:
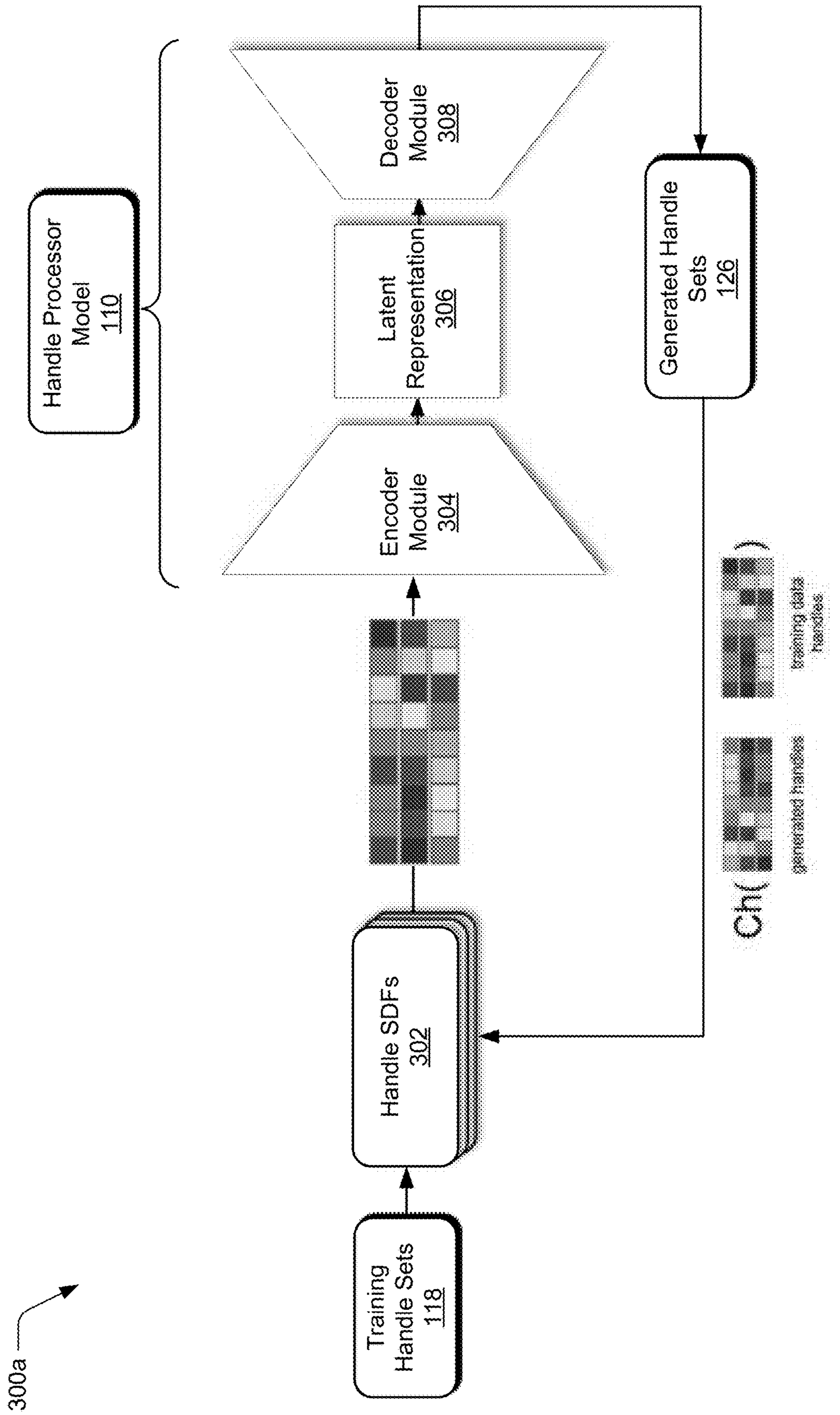
FIG. 3*a* depicts an example system that describes example details related to training and utilization of a handle processor model.

FIG. 3*a* depicts an example system 300*a* that describes example details related to training and utilization of the handle processor model 110, such as overviewed in the system 200. In the system 300*a*, a set of training handle sets 118 are converted into handle signed distance fields (SDFs) 302. Generally, each handle SDF 302 includes data describing a derived representation of a respective training handle from the training handle sets 118. Further details concerning generation of the handle SDFs 302 are discussed below. The handle SDFs 302 are input to an encoder module 304 of the handle processor model 110, which encodes the handle SDFs 304 to generate a latent representation 306 of the training handle sets 118. Generally, the latent representation 306 represents a manifold (e.g., a topological space) that describes different handle configurations. In at least one implementation, the handle processor model 110 is implemented as a variational auto-autoencoder (VAE) trained to reconstruct the training handle sets 118. Accordingly, the encoder module 304 can be implemented as a stack of fully connected layers (e.g., using batch normalization and Rectified Linear Unit (ReLU) activations) which independently processes each handle represented in the handle SDFs 302. The result of this processing is then aggregated through max-pooling and followed by another fully connected layer to generate the latent representation 306. Generally, the latent representation 306 represents salient characteristics of the training handle sets 118 derived from the encoder module 304 processing the handle SDFs 302.

Further to the system 300*a*, a decoder module 308 of the handle processor model 110 decodes the latent representation 306 to generate the generated handle sets 126. The generated handle sets 126, for instance, are parametric representations of the generated handle sets 126 that can be utilized to generate the generated shapes 124. In at least one implementation, the decoder module 308 is a stack of fully connected layers (e.g., using batch normalization and ReLU activations) that produces a parametric representation for n number of shape handles. As further described below, the number of generated handles in each of the generated handle sets 126 can be changed according to the complexity of the original dataset, e.g., complexity of the training handle sets 118. Further, and as also detailed below, training the handle processor model 110 can involve supervision implemented by varying a chamfer distance between SDF representations of the training handle sets 118 and the generated handle sets 126, respectively.

Figure 3B:
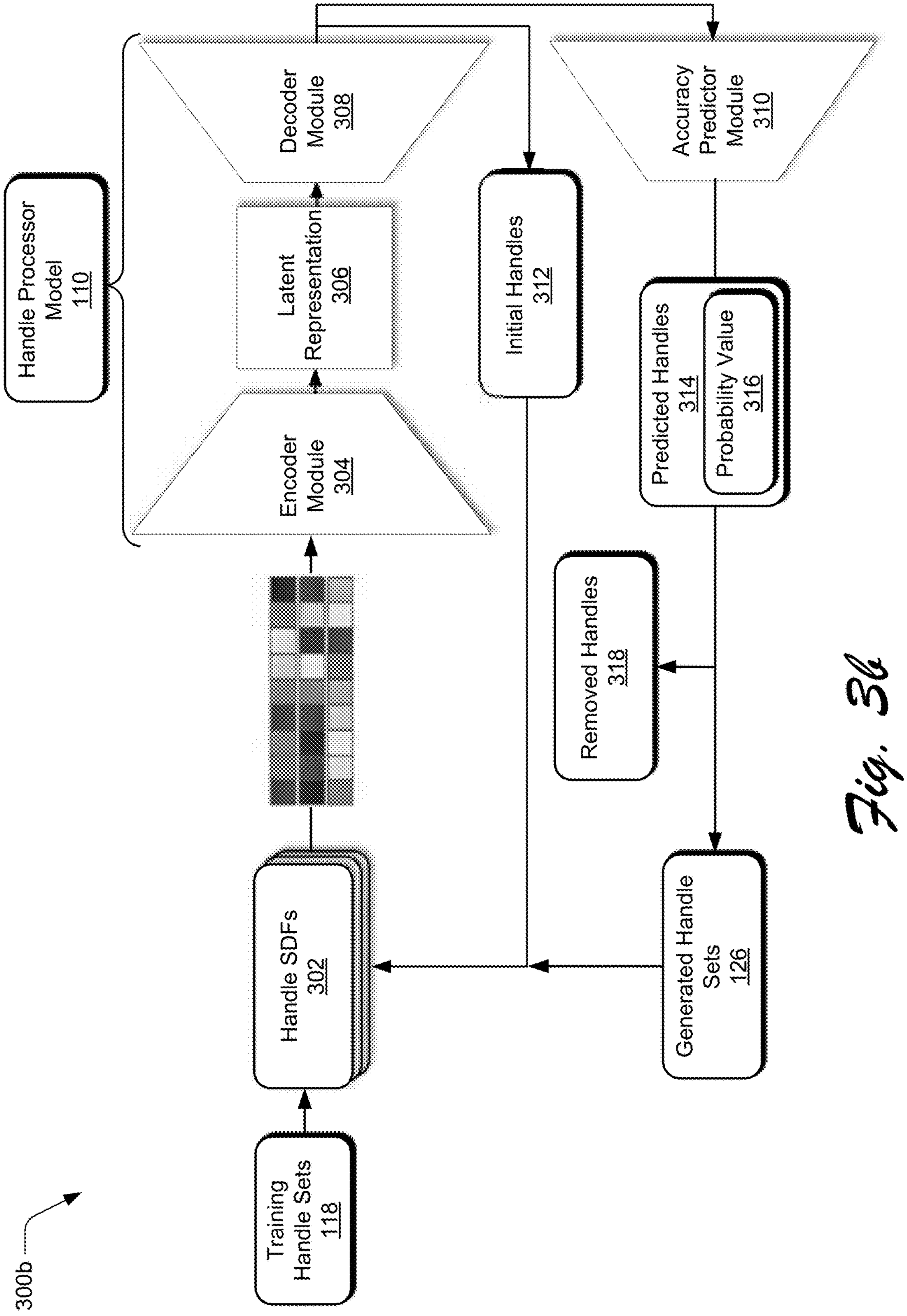
FIG. 3*b* depicts a system for incorporating handle accuracy prediction into a handle processor model

FIG. 3*b* depicts a system 300*b* for incorporating handle accuracy prediction into the handle processor model 110. The system 300*b*, for instance, represents a variation and/or extension of the system 300*a*. In the system 300*b*, an accuracy predictor module 310 is incorporated into the handle processor model 110. The accuracy predictor module 310, for instance, is representative of a branch of the decoder module 308 that is configured to predict whether handles generated by the handle processor model 110 meet a probability threshold such that the handles are to be kept or discarded.

Further to the system 300*b*, after the decoder module 308 is trained using the handle SDFs 302, the accuracy predictor module 310 is trained. For instance, in a first pass such as described with reference to the system 300*a*, the decoder module 308 generates initial handles 312 that represent parametric representations of handles output from the decoder module 308. The initial handles 312 are then transformed into the handle SDFs 302 (such as described below), and utilized to train the accuracy predictor module 310. For instance, latent representation 306 generated by the encoder module 304 based on the initial handles 312 are input to the accuracy predictor module 310, which decodes the latent representation 306 and generates predicted handles 314. Generally, each handle of the predicted handles 314 is associated with a probability value 316. Predicted handles 314 with a probability value 316 below a threshold probability value are discarded, as represented by removed handles 318. The remaining predicted handles 314 correspond to the generated handle sets 126. Thus, the system 300*b* is operable to remove inaccurately predicted handles and thus provide for accurate prediction of shape parameters.

Figure 4:
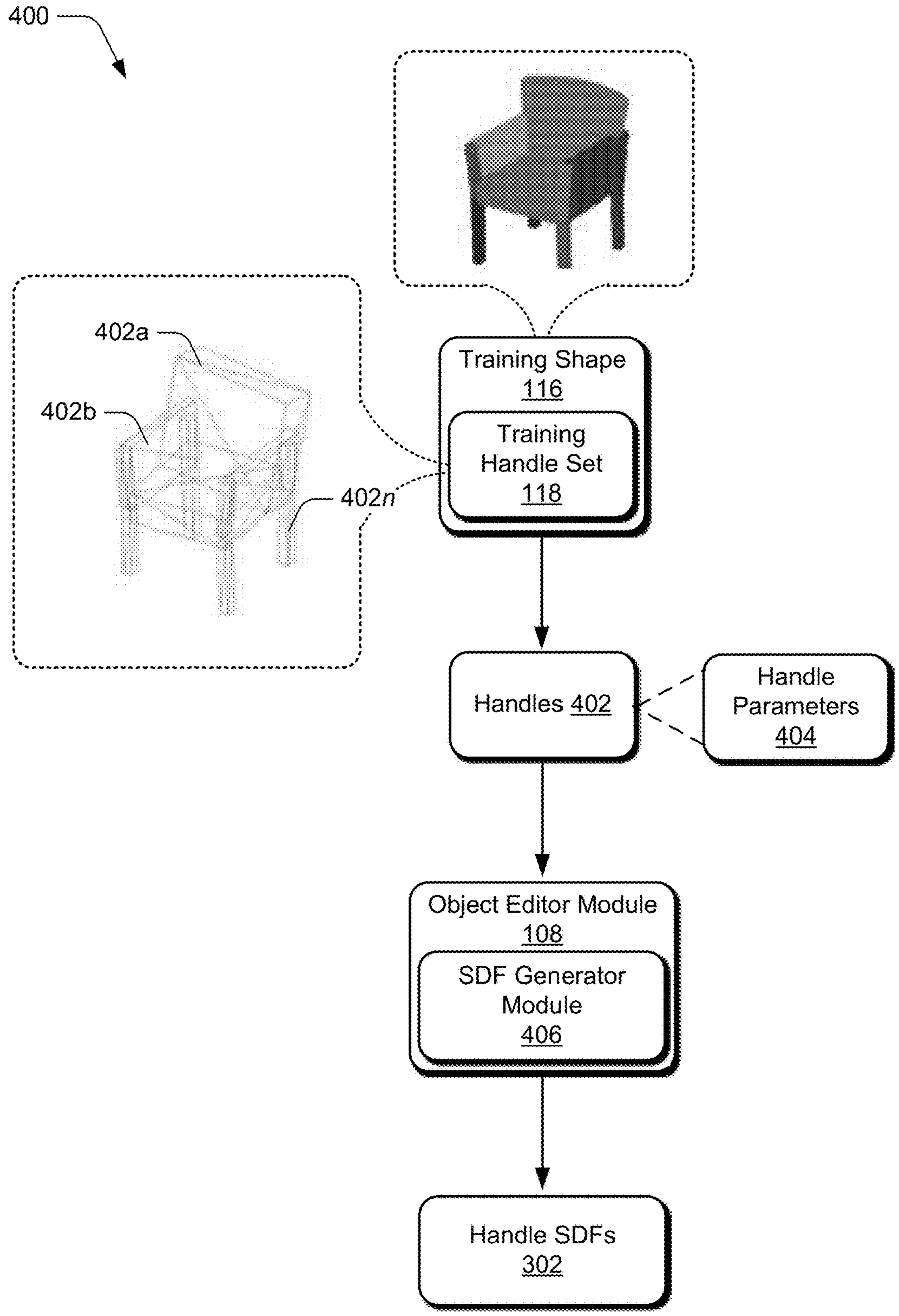
FIG. 4 depicts an example system for generating handle signed distance fields.

FIG. 4 depicts a system 400 for generating the handle SDFs 302. Depicted as part of the system 400 is a training shape 116 composed of a training handle set 118. In this particular example, the training handle set 118 includes multiple handles 402 that combine to form the training shape 116. Examples of the handles 402 include a handle 402*a*, a handle 402*b*, . . . , and a handle 402*n*. In this particular example, the handles 402*a*-402*n* represent different cuboids that make up portions of the training shape 116. Further, the handles 402 each include different handle parameters 404 that describe attributes of each handle 402, such as geometric and/or visual attributes. Examples of the handle parameters 404 include parametric representations of each handle 402, such as handle size (e.g., length, width, height), handle center location, handle rotation, and so forth.

Further to the system 400, the handles 402 are input to an SDF generator module 406 of the object editor module 108, which processes the handle parameters 404 to generate the handle SDFs 302. Example ways for generating the handle SDFs 302 based on the handle parameters 404 are discussed below.

Figure 5:
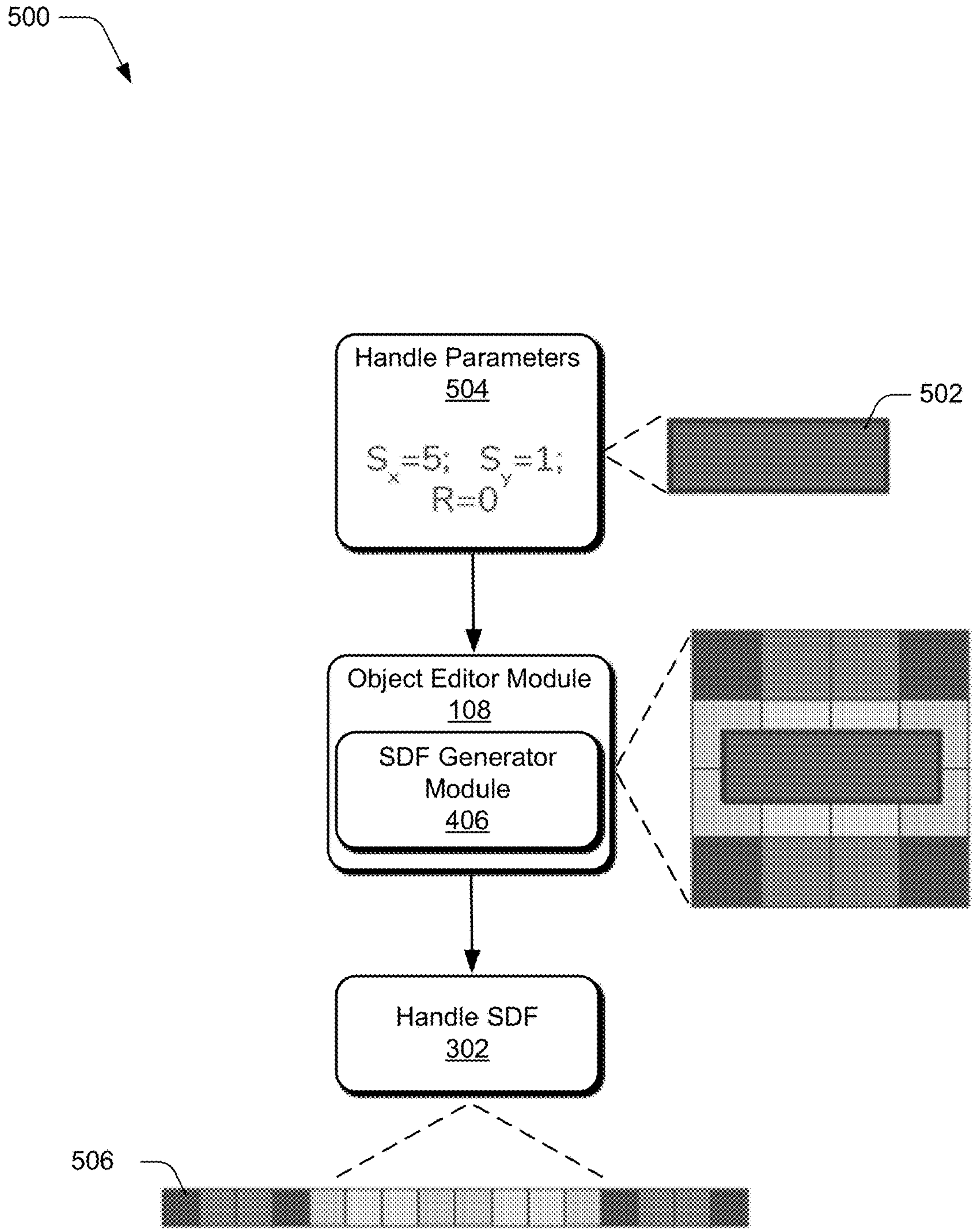
FIG. 5 depicts a system describing example aspects of generating signed distance fields based on handle parameters.

FIG. 5 depicts a system 500 describing example aspects of generating an SDF based on handle parameters. The system 500 includes a handle 502, which represents an instance of a training handle 118 and/or a generated handle 126. Further, the handle 502 includes handle parameters 504, which indicate a handle length of 5 ($S_x=5$), a handle width of 1 ($S_y=1$), and a handle rotation value of 0, e.g., R=0.

Continuing, the SDF generator module 406 processes the handle parameters 504 to generate a handle SDF 302 that represents an SDF representation of the handle parameters 404. In at least one implementation, the SDF generator module 406 generates the handle SDF 302 using a signed distance function computed in a coarse regular grid. For instance, the handle SDF 302 can be generated as a grid with $8^3$ cells, e.g., a grid with 256 dimensions. The handle SDF 302 can then be "flattened" to generate a flattened SDF 506 that is utilized to train the handle processor model 110, and to utilize the trained handle processor model 110 to perform various shape related tasks.

Figure 6:
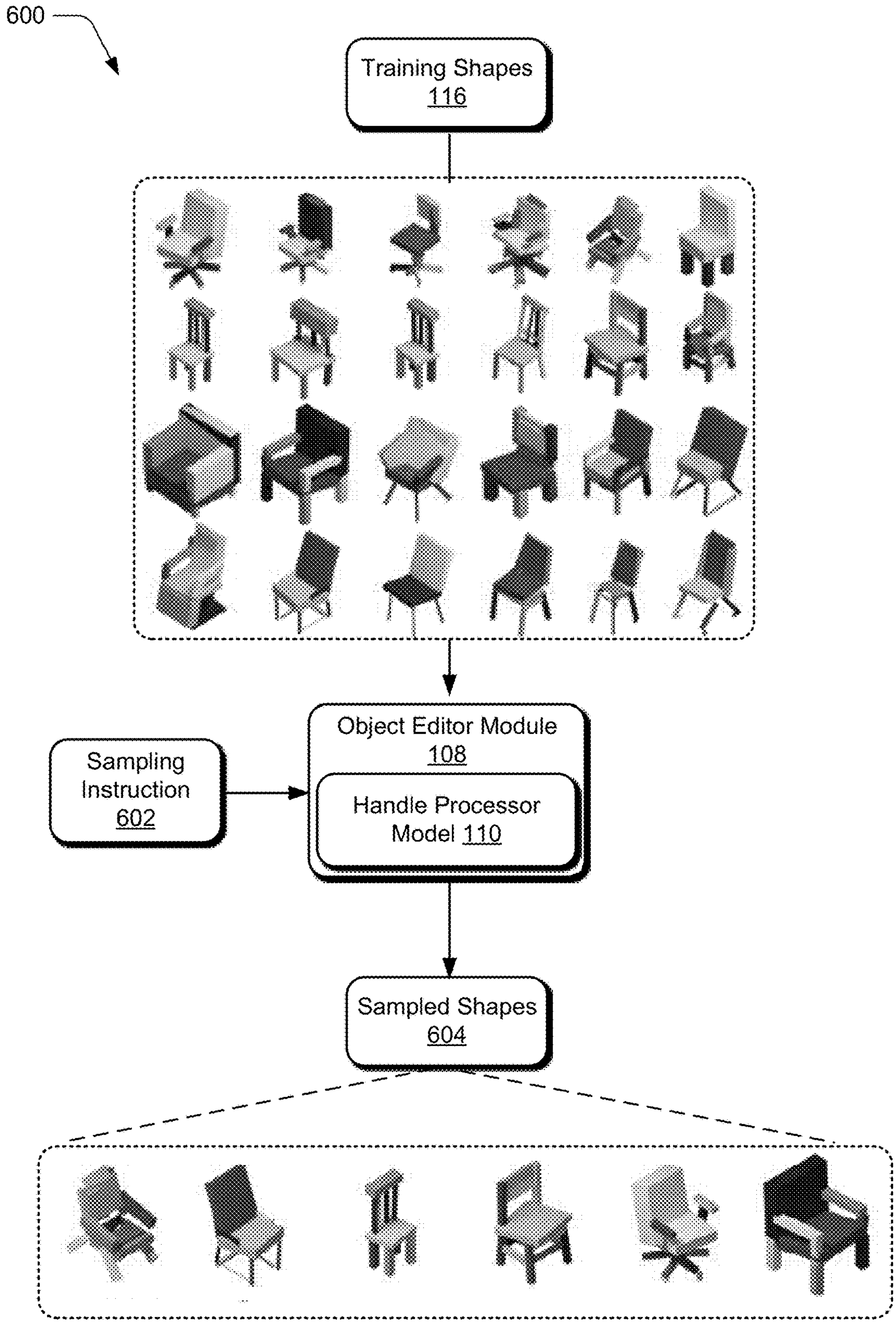
FIG. 6 depicts an example system for shape generation.

FIG. 6 depicts a system 600 for shape generation. In the system 600, the training shapes 116 are utilized to train the handle processor model 110. Further, a sampling instruction 602 is input to the object editor module 108, and the object editor module 108 leverages the trained handle processor model 110 to generate sampled shapes 604. The sampled shapes 604, for instance, represent shapes generated by the trained handle processor model 110 by sampling different values from z values obtained from the latent representation 306, and generating shapes based on the sampled z values.

Figure 7:
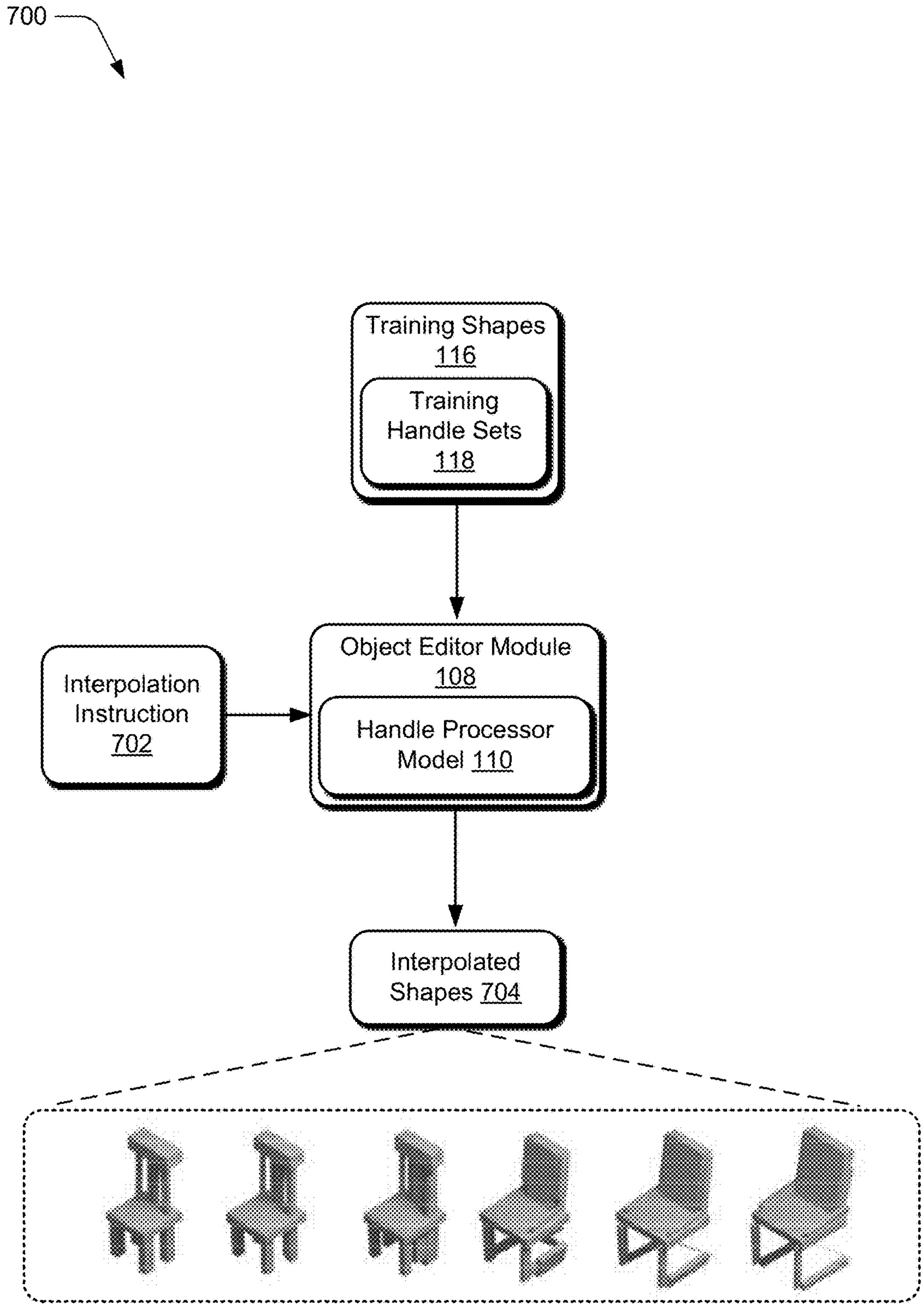
FIG. 7 depicts an example system for generating shapes via interpolation.

FIG. 7 depicts a system 700 for generating shapes via interpolation. In the system 700, the training shapes 116 are utilized to train the handle processor model 110. Further, an interpolation instruction 702 is input to the object editor module 108, and the object editor module 108 leverages the trained handle processor model 110 to generate interpolated shapes 704. The object editor module 108, for instance, leverages the trained handle processor model 110 to linearly interpolate different z values obtained from the latent representation 306, and to generate the interpolated shapes 704 based on the linear interpolations.

Figure 8:
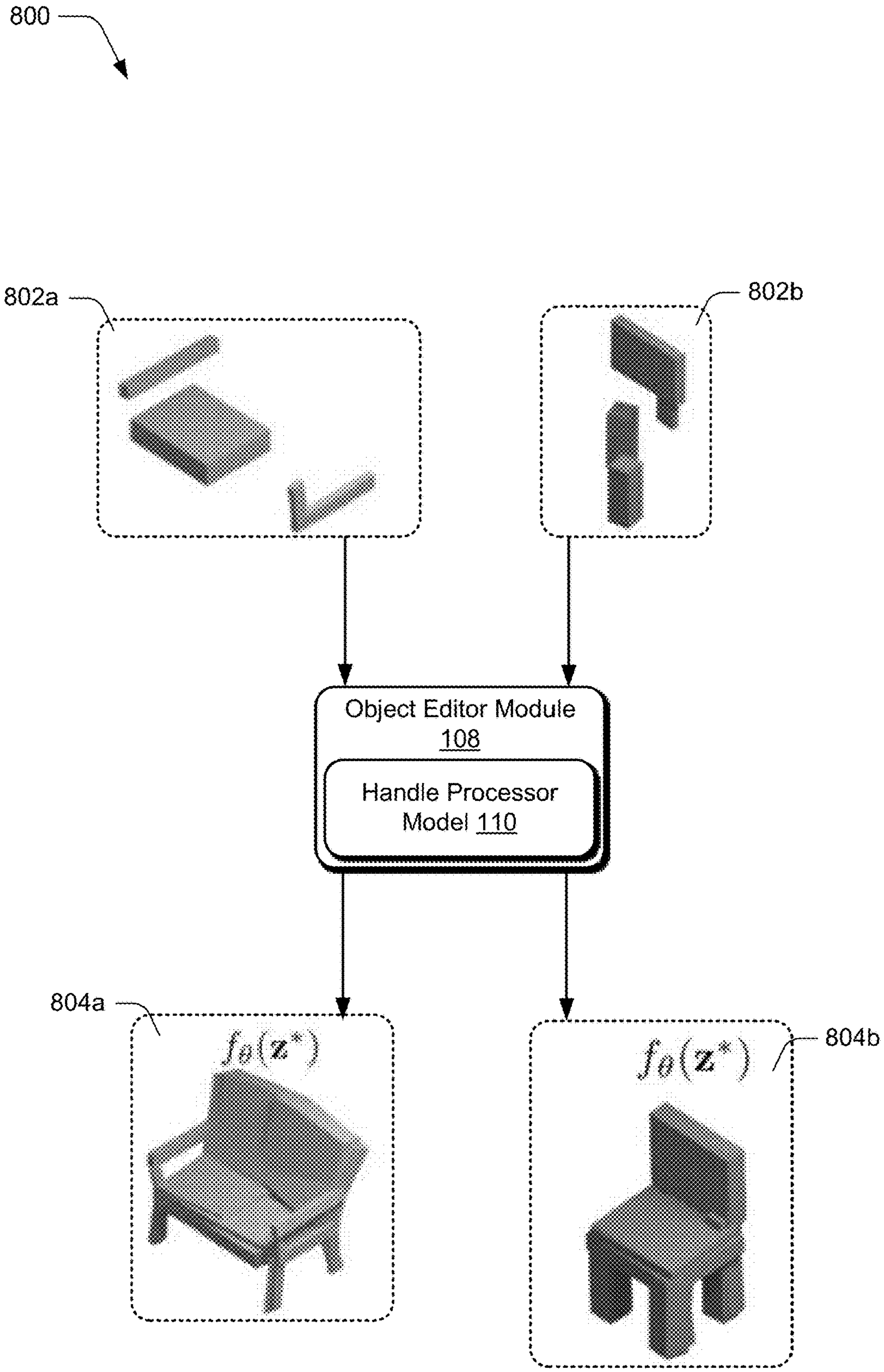
FIG. 8 depicts an example system for generating shapes via shape completion.

FIG. 8 depicts a system 800 for generating shapes via shape completion. In the system 800, different sets of input handles (e.g., including at least one handle) are input to the object editor module 108, which leverages the handle processor model 110 to generate different shapes from the input handles. For instance, input handles 802*a* are input to the object editor module 108, which leverages the handle processor model 110 to generate an output shape 804*a* based on the input handles 802*a*. In another example, input handles 802*b* are input to the object editor module 108, which leverages the handle processor model 110 to generate an output shape 804*b* based on the input handles 802*b*. In at least some implementations, and as further detailed below, the output shapes 804*a*, 804*b* can be generated by utilizing the handle processor model 110 to apply a gradient descent algorithm to the input handles 802*a*, 802*b* to generate the output shapes 804*a*, 804*b*, respectively. Generally, the output shapes 804*a*, 804*b* represent larger sets of handles than the input handles 802*a*, 802*b*, and in at least some implementations can be considered "complete shapes" that are completed based on the input handles 802*a*, 802*b* according to salient shape properties represented in the latent representation 306.

Figure 9:
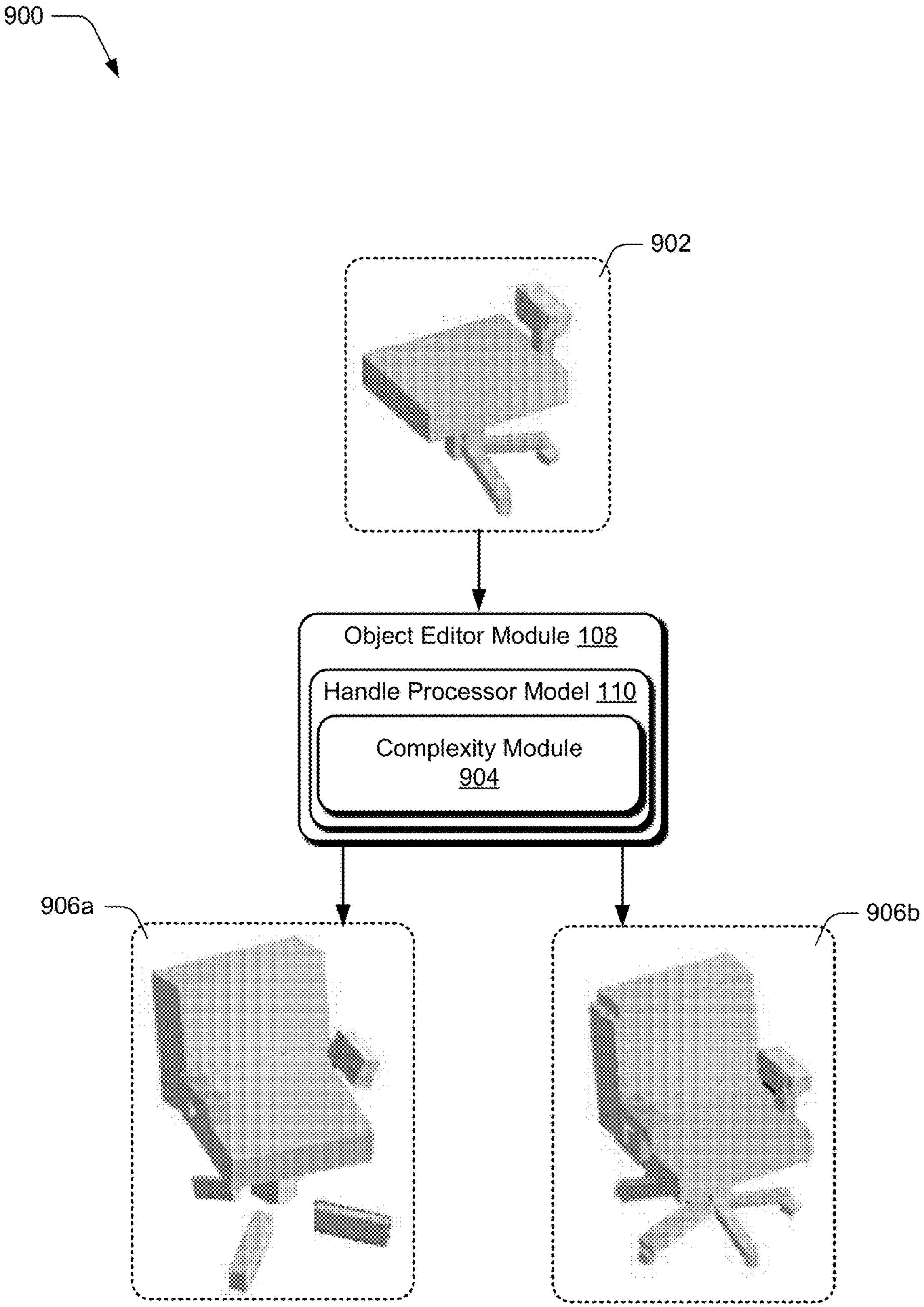
FIG. 9 depicts an example system for generating shapes of different complexity via shape completion.

FIG. 9 depicts a system 900 for generating shapes of different complexity via shape completion. In the system 900, input handles 902 are input to the object editor module 108, which leverages the handle processor model 110 to generate different shapes from the input handles. For instance, by utilizing the accuracy predictor module 310, a complexity module 904 can be introduced and manipulated to generate output shapes of differing complexity. In at least one implementation, the complexity module 904 represents a parsimony regularizer, operation of which is detailed below. By manipulating operational values of the complexity module 904, an output shape 906*a* and an output shape 906*b* are generated and output by the object editor module 108. Notice that the output shape 906*b* includes more handles than the output shape 906*a*, and thus the output shapes 906*a*, 906*b* different from each other in handle complexity.

Figure 10:
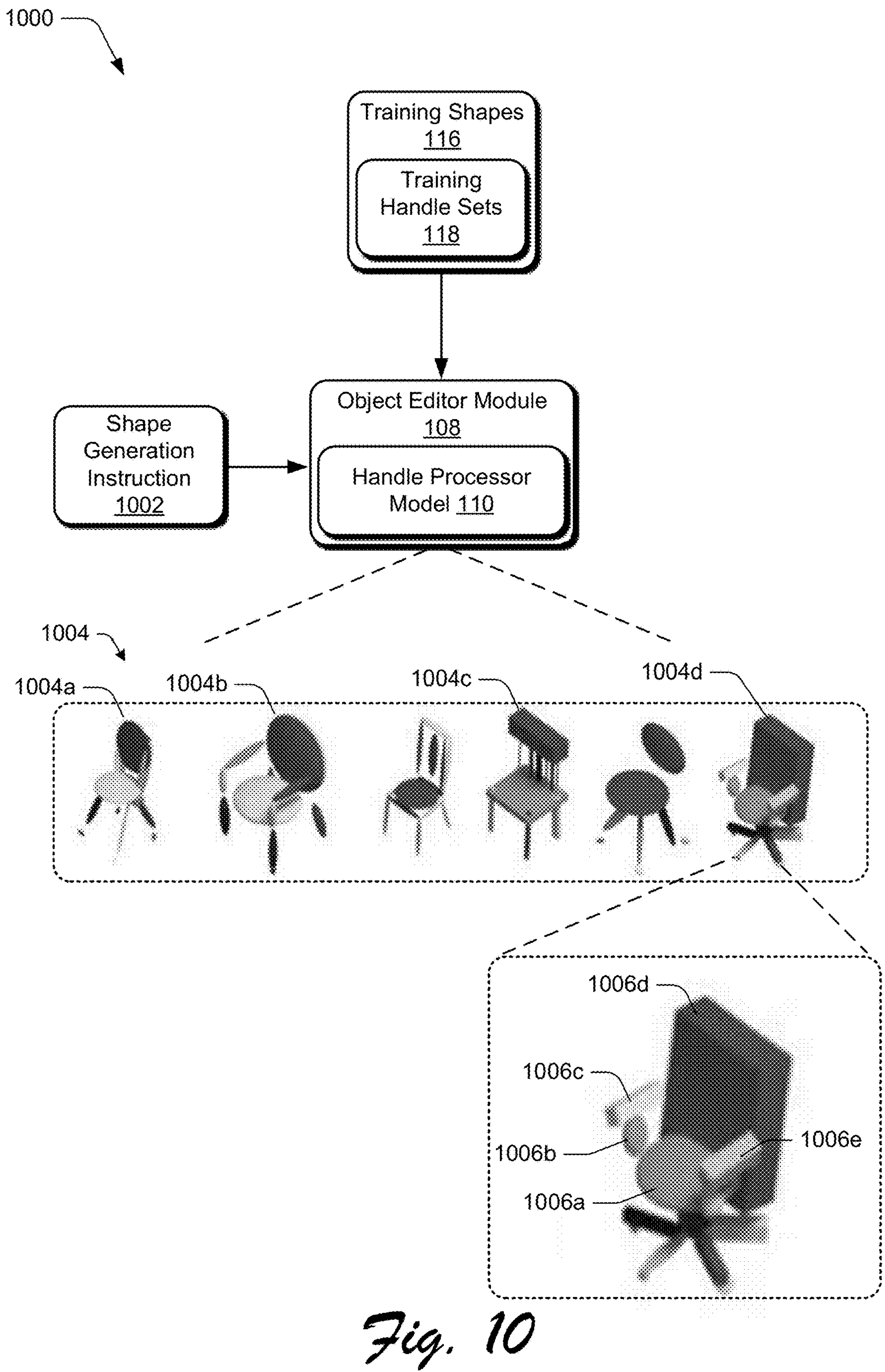
FIG. 10 depicts an example system for generating shapes of with different handle types.

FIG. 10 depicts a system 1000 for generating shapes of with different handle types. In the system 1000, the training shapes 116 are utilized to train the handle processor model 110. Further, a shape generation instruction 1002 is input to the object editor module 108, and the object editor module 108 leverages the trained handle processor model 110 to generate output shapes 1004 that are comprised of different types of handles. For instance, output shapes 1004*a*, 1004*b* are made up of ellipsoid handles, and an output shape 1004*c* is made up of cuboid handles. Further, an output shape 1004*d* is made up of both cuboid and ellipsoid handles. For instance, the output shape 1004*d* includes ellipsoid handles 1006*a*, 1006*b*, and cuboid handles 1006*c*, 1006*d*, and 1006*e*. In at least one implementation, by utilizing SDF representations of handles as part of the training handle sets 118, different handle types can be represented and utilized as part of shape generation. For instance, handle shapes that are capable of being represented as an SDF (e.g., cuboids, ellipsoids, and so forth) can be utilized as part of the training handle sets 118 such that the handle processor model 110 can generate shapes with different handle types. In at least one implementation, and as detailed below, a particular loss function utilized as part of the handle processor model 110 enables variation in handle type.

Having discussed example details of the techniques for generative shape creation and editing, consider now some example procedures to illustrate additional aspects of the techniques.

Example Procedures

This section describes example procedures for generative shape creation and editing in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as via the object editor system 102 of FIG. 1 that makes use of the object editor module 108 and using aspects described in the scenarios above.

Figure 11:
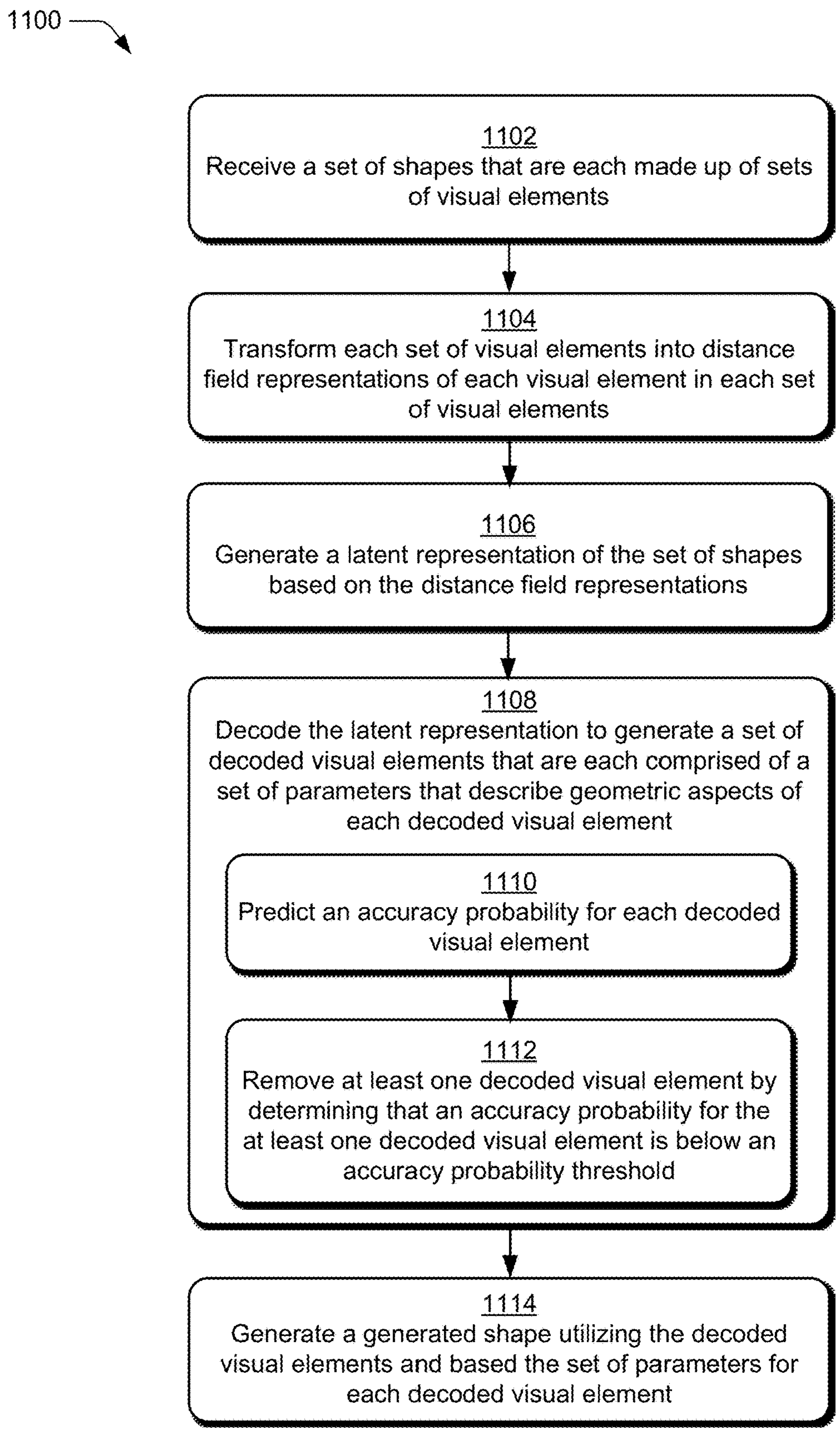
FIG. 11 depicts an example procedure for generating shapes.

FIG. 11 depicts an example procedure 1100 for generating shapes. Step 1102 receives a set of shapes that are each made up of sets of visual elements. The object editor module 108, for instance, receives as input the training shapes 116 including the training handle sets 118. In at least one implementation, a user interacts with the editor GUI 130 to cause the training shapes 116 to be input to the object editor system 102 as part of initiating a shape generation process.

Step 1104 transforms each set of visual elements into distance field representations of each visual element in each set of visual elements. The SDF generator module 406, for example, processes parameters for each handle in a handle training set 118 to generate the handle SDFs 302. Generally, this includes representing the handle parameters in cells of a fixed 3D grid, and computing the distance of each grid cell to the handle. As mentioned above, for instance, using a grid with $8^3$ cells results in 256 dimensions and thus would result in 256 SDF values. These values are "flattened" in a vector representation, e.g., the signed distance of a top left grid cell becomes a first element in the vector, and so on, until all of the SDF values are represented in the vector representation.

Step 1106 generates a latent representation of the set of shapes based on the distance field representations. The encoder module 304, for instance, processes the handle SDFs 302 as part of the training the handle processor model 110, and then generates the latent representation 306.

Initially, to train the handle processor model 110, the object editor module 108 defines a chamfer distance between two handle sets A and B, where A corresponds to a training handle set from the training handle sets 118, and B corresponds to a generated handle set from the generated handle sets 126. The chamfer distance can be calculated as:

$$Ch(A, B) = \frac{1}{|A|}\sum_{a \in A} \min_{b \in B} D(a, b) \qquad \text{Equation 1}$$

Generally, (a, b) represent individual handles from each handle set A, B, respectively, and D(a, b) is a distance between elements in the respective sets. Further, in an implementation where the respective handles in the handle sets are represented as values of respective SDFs evaluated in a coarse regular grid, D(a, b) represents an L2 distance (e.g., a Euclidean distance) between a and b.

Accordingly, training the handle processor model 110 includes solving the following equation, such as through stochastic gradient descent:

$$\underset{\theta}{\operatorname{argmin}} \qquad \text{Equation 2}$$

$$\mathbb{E}_{x \sim \mathcal{D}}\left[\frac{1}{|f_\theta(X)|}\sum_{a \in f_\theta(X)} \min_{x \in X} \|x - a\|_2^2 + \frac{1}{|X|}\sum_{x \in X} \min_{a \in f_\theta(X)} \|x - a\|_2^2\right]$$

In Equation 2, $f_\theta$ represents the handle processor model 110 (e.g., the encoder module 304 and/or the decoder module 308), X represents sample SDFs from the training handle set 118 (e.g., the handle SDFs 302), and x represents individual elements from the sample SDFs. Accordingly, solving Equation 2 generates the latent representation 306, e.g., the z variable as used throughout.

As referenced above, implementations can enable multiple different handle types to be utilized for shape generation. An example way for enabling multiple handle types is by adding a term in the loss function that attempts to match the handle type of a generated handle with a labeled handle type of the training handle sets 118, such as identified by the training labels 120. The modified loss term can be defined as:

$$\mathcal{L}_C(A, B) = \frac{1}{|B|}\sum_{b\in B} H\left(C\left(\underset{a\in A}{\operatorname{argmin}}\|a-b\|_2^2, C(b)\right)\right) \quad \text{Equation 3}$$

In Equation 3, H is a cross-entropy function and C is a function that returns the label of a generated handle. In at least one implementation, C is not an additional function, but is parametrized by the handle processor model 110 by modifying the term to generate an extra one-hot encoding per handle. Further, C(b) is determined from the training labels 120.

Step 1108 decodes the latent representation to generate a set of decoded visual elements that are each comprised of a set of parameters that describe geometric aspects of each decoded visual element. The decoder module 308, for instance, decodes the latent representation 306 to generate the generated handle sets 126. In at least one implementation, decoding the latent representation 306 includes converting SDFs represented in the latent representation 306 into corresponding handle parameters, e.g., parameters that define the generated handle sets 126.

Implementations can utilize existence prediction to enable inaccurately generated handles to be filtered out, e.g., removed. Accordingly, step 1110 predicts an accuracy probability for each decoded visual element. The accuracy predictor module 310, for instance, processes each initial handle 312 generated by the decoder module 308 to determine a probability value for each initial handle 312. In at least one example, the probability for each initial handle 312 is calculated by training the accuracy predictor module 310 to predict a probability value P(a) for each initial handle 312. Generally, this includes incorporating P(a) into the loss function (described above with reference to Equations 1-3) utilized by the handle processor model 110. For instance, the bidirectional chamfer distance between two sets of the predicted handles 314 is rewritten in a probabilistic manner as:

$$\mathcal{L}_C(A, B) = \mathbb{E}_{a\sim A}\left[\min_{b\in B}\|a-b\|_2^2\right] + \mathbb{E}_{b\sim B}\left[\min_{a\in A}\|a-b\|_2^2\right] \quad \text{Equation 4}$$

Each of these terms can be calculated as:

$$\mathbb{E}_{a\sim A}\left[\min_{b\in B}\|a-b\|_2^2\right] = \sum_{a\in A} P(a)\min_{b\in B}\|a-b\|_2^2 \quad \text{Equation 5}$$

$$\mathbb{E}_{b\sim B}\left[\min_{a\in A}\|a-b\|_2^2\right] = \sum_{b\in B}\sum_{i=1}^{i=|A|} P(a_i)\|a-b\|_2^2 \prod_{i=1}^{j-i}(1-P(a_i)) \quad \text{Equation 6}$$

Generally, $a_i$ represents an i-th handle sorted according to its distance to b. Further, L(A, B) is used to train the accuracy predictor module 310 to predict P(a) while keeping the predicted parameters (e.g., geometric parameters) of the handles constant. This training process, for instance, trains the accuracy predictor module 310 to filter out inaccurately predicted handles. For instance, P(a) will be smaller (e.g., below a probability threshold) for handles that have a larger contribution to a loss, e.g., inaccurately predicted handles. Further, removing an accurately predicted handle will increase the loss, thus indicating that a handle is accurate. In at least one implementation, the distance between elements (a, b) in the sets is the sum of squared differences between the calculated SDF for the respective elements.

Step 1112 removes at least one decoded visual element by determining that an accuracy probability for the at least one decoded visual element is below an accuracy probability threshold. For instance, the accuracy predictor module 310 determines that an accuracy probability for the decoded visual element is below a specified accuracy threshold, such as based on determining that a loss contribution of the decoded visual element exceeds a threshold loss.

Step 1114 generates a generated shape utilizing the decoded visual elements and based the set of parameters for each decoded visual element. The object editor module 108, for instance, generates a generated shape 124 utilizing handles generated by the handle processor model 110, e.g., a generated handle set 126 output by the decoder module 308. In implementations that utilize accuracy prediction, handles that are indicated as inaccurately predicted and thus removed are not utilized to generate the shape. Generally, a shape may be generated in accordance with various shape generation scenarios, such as described above for shape sampling (e.g., the system 600), shape interpolation (e.g., the system 700), and shape completion, e.g., the systems 800, 900. Further, a generated shape can be displayed on the display device 132 of the client device 104, such as to enable further editing of the generated shape via interaction with the object editor system 102.

Figure 12:
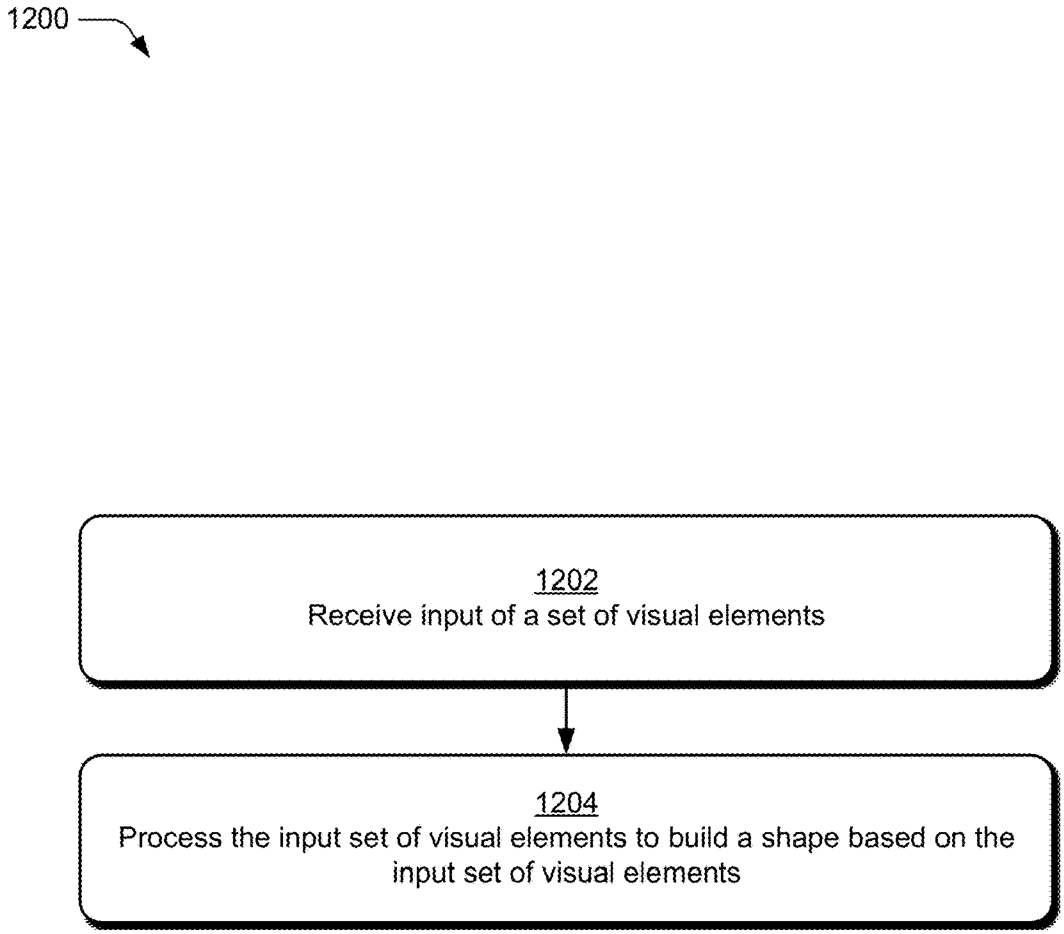
FIG. 12 depicts an example procedure for shape completion.

FIG. 12 depicts an example procedure 1200 for shape completion. Step 1202 receives input of a set of visual elements. A user, for instance, interacts with the editor GUI 130 to cause a set of handles to be input to the object editor system 102. Generally, the handles can be input in various ways, such as via selection of a set of pre-generated handles, a user drawing a handle set via the object editor module 108, a user selection of a set of preconfigured shapes, and so forth.

Step 1204 processes the input set of visual elements to build a shape based on the input set of visual elements. An input set of handles, for instance, is input to the handle processor model 110, which processes the input handles to generate an output shape that augments the input handles with additional handles to generate a "completed" shape. Generally, the object editor module 108 can leverage the handle processor model 110 to automatically generate a completed shape based on a small subset of input handles.

In at least one implementation, building a shape based on the input set of handles involves utilizing the latent representation 306 (e.g., the z variable) the complete the input handles via gradient descent. For instance, consider the following:

$$z^* = \underset{z}{\operatorname{argmin}}\, Ch(f_\theta(z), A') \quad \text{Equation 7}$$

In Equation 7, $f_\theta$ represents the handle processor model 110 (e.g., the decoder module 308), and A' represents the input set of handles, e.g., the input handles 802, 902. Accordingly, a "completed" shape can be characterized as $f_\theta(z^*)$.

As mentioned above with reference to the system 900, techniques can be employed to complete shapes of different complexity, e.g., completed shapes with differing numbers of handles. To control shape complexity, the accuracy predictor module 310 can be leveraged to introduce a parsimony component to generate sets of handles with differing complexity for shape completion, such as based on the following optimization:

$$z^* = \underset{z}{\operatorname{argmin}} Ch(f_\theta(z), A') + \lambda \mathbb{E}_{a_i \sim f_\theta(z)}[g_\phi(z) a_i] \qquad \text{Equation 8}$$

In at least one implementation, Equation 8 can be leveraged to implement the complexity module 904 discussed with reference to the system 900. For instance, Equation 8 represents a parsimony regularizer, and the value of λ can be manipulated to vary the complexity of a completed shape. In at least one implementation, λ represents a complexity variable that can be manipulated to affect the complexity of a generated shape. In the scenario 900, for example, the output shape 906*a* is based on λ=10, and the output shape 906*b* is based on λ=0. In at least one implementation, a user can interact with the editor GUI 130 to input different λ values to enable shape completion using different handle complexities.

Figure 13:
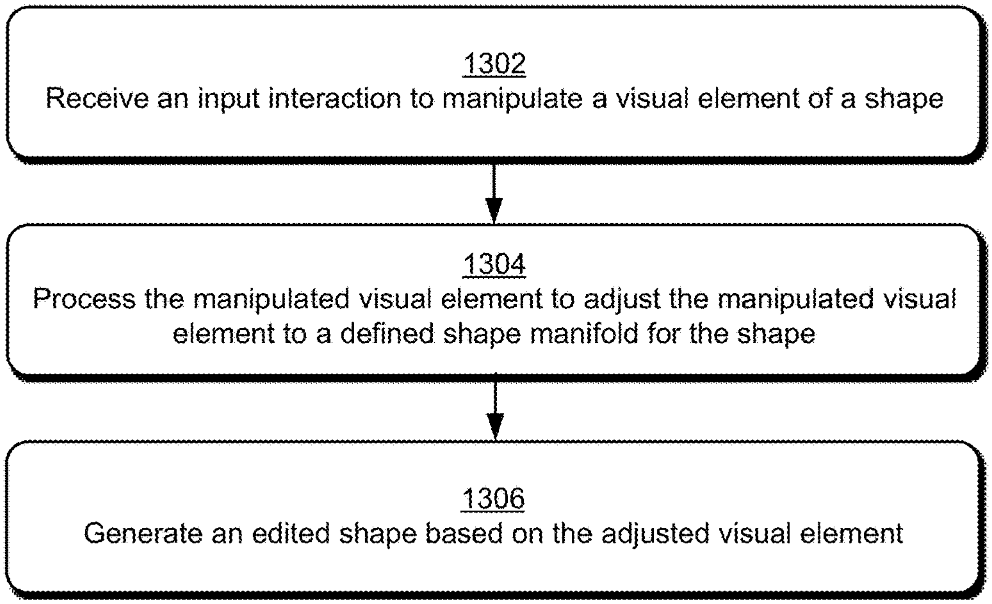
FIG. 13 depicts an example procedure for shape editing.

FIG. 13 depicts an example procedure 1300 for shape editing. For instance, after a shape is generated as described above, a user may interact with the object editor module 108 to edit the shape. In at least one implementation, shape editing includes user manipulation of handles that make up the shape.

Step 1302 receives an input interaction to manipulate a visual element of a shape. A user, for instance, interacts with the object editor system 102 to manipulate a handle included as part of a shape, such as a generated shape 124. Generally, the manipulation can take various forms, such as user input to resize a handle, change a handle shape, and/or to move a handle, such as through translational movement, rotational movement, and so forth.

Step 1304 processes the manipulated visual element to adjust the manipulated visual element to a defined shape manifold for the shape. The shape manifold, for instance, is based on the latent representation 306, which defines a set of plausible handle configurations. Thus, in a scenario where a user manipulates a handle such that parameters of the handle (e.g., position, size, and/or shape) do not conform to the latent representation 306, the object editor module 108 can reposition and/or resize the manipulated handle to conform to the latent representation 306.

In at least one implementation, the object editor module 108 adjusts the manipulated handle via backpropagation of the shape with the manipulated handle through the trained decoder module 308. For instance, the decoder module 308 compares parameters of the manipulated handle to the latent representation 306, and causes parameters of the manipulated handle to be adjusted to conform to shape parameters represented by the latent representation 306.

Step 1306 generates an edited shape based on the adjusted visual element. The object editor module 108, for example, generates a new shape that reflects the original shape as modified by the user manipulation of the handle and the adjusted handle as adjusted by the handle processor model 110.

Accordingly, the described techniques can be employed to enable shape editing that adjusts edited shapes based on salient features of shapes used for training, such as the latent representation 306 generated from the training shapes 116.

Having described example procedures in accordance with one or more implementations, consider now an example system and device that can be utilized to implement the various techniques described herein.

Example System and Device

Figure 14:
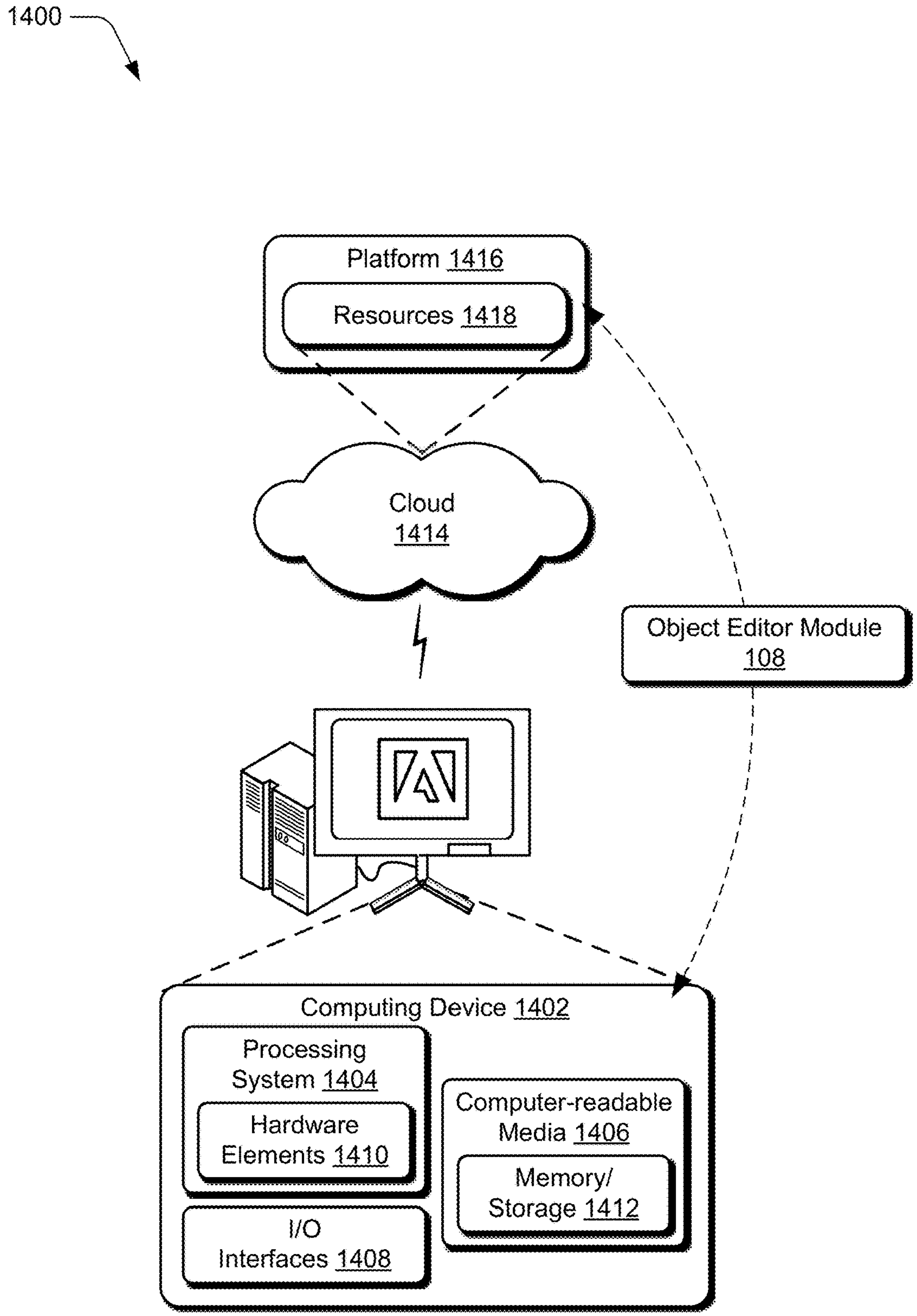
FIG. 14 illustrates an example system including various components of an example device that can be implemented as any type of computing device as described and/or utilized with reference to FIGS. 1-13 to implement aspects of the techniques described herein.

FIG. 14 illustrates an example system generally at 1400 that includes an example computing device 1402 that is representative of one or more computing systems and/or devices that may implement the various techniques described herein. This is illustrated through inclusion of the object editor module 108. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for generating shapes implemented by at least one computing device, the method comprising:
- receiving, by the at least one computing device, a set of shapes that are each made up of a set of visual elements;
- transforming, by the at least one computing device, each set of visual elements into distance field representations of each visual element in each set of visual elements;
- generating, by the at least one computing device, a latent representation of the set of shapes based on the distance field representations, said generating including:
  - training, by the at least one computing device, a machine learning model using the distance field representations; and
  - generating the latent representation by the trained machine learning model as distance field representations of geometric relationships between the visual elements in each set of visual elements;
- decoding, by the at least one computing device, the latent representation to generate a set of decoded visual elements that are each comprised of a set of parameters that describe geometric aspects of each decoded visual element; and
- generating, by the at least one computing device, a shape utilizing the decoded visual elements and based on the set of parameters for each decoded visual element.

2. A method as described in claim 1, wherein said transforming comprises calculating, by the at least one computing device, the distance field representations as signed distance field versions of geometric parameters of the visual elements in each set of visual elements.

3. A method as described in claim 2, wherein the geometric parameters comprise one or more of visual element size, center location, or visual element rotation.

4. A method as described in claim 1, further comprising:
- calculating, by the at least one computing device, an accuracy probability for each decoded visual element of the set of decoded visual elements; and
- removing, by that at least one computing device, a particular decoded visual element based on determining that an accuracy probability for the particular decoded visual element is below a threshold accuracy probability.

5. A method as described in claim 1, wherein said decoding comprises sampling, by the at least one computing device, different values from the latent representation, and wherein said generating further comprises generating, by the at least one computing device, multiple different generated shapes that each correspond to a different sampled value from the latent representation.

6. A method as described in claim 1, wherein said decoding comprises performing, by the at least one computing device, interpolation of values from the latent representation, and wherein said generating further comprises generating, by the at least one computing device, multiple different generated shapes that each correspond to a different interpolated value from the latent representation.

7. A method as described in claim 1, further comprising:
- receiving, by the at least one computing device, a subset of visual elements; and
- processing, by the at least one computing device, the subset of visual elements by inputting the subset of visual elements into the training machine learning model and building a shape based on additional visual elements output from the machine learning model.

8. A method as described in claim 7, wherein said building the shape is based on a complexity variable that affects a number of visual elements included in the additional visual elements.

9. A method as described in claim 1, further comprising:
- receiving an input interaction to manipulate a visual element of the generated shape;
- processing the manipulated visual element to adjust the manipulated visual element to a defined shape manifold for the shape, wherein the shape manifold is based on the latent representation; and
- generating an edited shape based on the adjustment to the manipulated visual element.

10. A method for generating shapes implemented by at least one computing device, the method comprising:
- transforming, by the at least one computing device, a set visual elements into distance field representations of the visual elements;
- generating, by the at least one computing device, a latent representation of the visual elements based on the distance field representations, said generating including:
  - training, by the at least one computing device, a machine learning model by inputting the distance field representations into the machine learning model; and
  - generating the latent representation by the trained machine learning model as distance field representations of geometric relationships between the visual elements in each set of visual elements;
- decoding, by the at least one computing device, the latent representation to generate a set of decoded visual elements that are each comprised of a set of parameters that describe geometric aspects of each decoded visual element;
- removing, by the at least one computing device, at least one decoded visual element by predicting an accuracy probability for each decoded visual element, and determining that an accuracy probability for the at least one decoded visual element is below an accuracy probability threshold; and
- generating, by the at least one computing device, a shape utilizing the remaining decoded visual elements and based the set of parameters for each remaining decoded visual element.

11. A method as described in claim 10, further comprising receiving, by the at least one computing device, user input to a graphical user interface to input a set of shapes, wherein the set of visual elements comprise different geometric elements that combine to form the set of shapes.

12. A method as described in claim 10, wherein the machine learning model utilizes a loss function, and wherein said predicting an accuracy probability for each decoded visual element comprises configuring a bidirectional chamfer distance of the loss function to enable the machine learning model to predict an accuracy probability based on an affect effect of each decoded visual element on evaluation of the loss function.

13. A method as described in claim 10, wherein said decoding comprises sampling, by the at least one computing device, different values from the latent representation, and wherein said generating further comprises generating, by the at least one computing device, multiple different generated shapes utilizing the remaining decoded visual elements that each correspond to a different sampled value from the latent representation.

14. A method as described in claim 10, wherein said decoding comprises performing, by the at least one computing device, interpolation of values from the latent representation, and wherein said generating further comprises generating, by the at least one computing device, multiple different generated shapes that each correspond to a different interpolated value from the latent representation.

15. A method as described in claim 10, wherein the set of visual elements includes different types of geometric primitives, and wherein the generated shape includes at least one of each of the different types of geometric primitives.

16. A system for generating shapes, the system comprising:

a distance field generator module implemented at least partially in hardware of at least one computing device to transform a first set of visual elements of a set of shapes into a set of distance field representations of the first set of visual elements;

a machine learning model implemented at least partially in the hardware of the at least one computing device to:

train the machine learning model using the distance field representations; and encode the distance field representations to generate a latent representation of the set of shapes, the latent representation including distance field representations of geometric relationships between the visual elements in the first set of visual elements; and a decoder module implemented at least partially in the hardware of the at least one computing device to decode the latent representation and generate a second set of visual elements based on shape parameters specified by the decoded latent representation, and to generate a shape based on the second set of visual elements.

17. A system as described in claim 16, further comprising an accuracy predictor module implemented at least partially in hardware of at least one computing device to generate an accuracy probability for each visual element of the second set of visual elements, to determine that an accuracy probability of at least one visual element is below a probability threshold, and to remove the at least one visual element from the second set of visual elements prior to generating the generated shape.

18. A system as described in claim 16, further comprising an object editor module implemented at least partially in hardware of at least one computing device to receive user input specifying a type of editing instruction, and wherein the decoder module is configured to generate the generated shape based on the type of editing instruction.

19. A system as described in claim 16, wherein to transform the first set of visual elements of the set of shapes into the set of distance field representations comprises to implement the distance field generator module to calculate the set of distance field representations as signed distance field versions of geometric parameters of visual elements in the first set of visual elements, wherein the geometric parameters comprise one or more of visual element size, center location, or visual element rotation of the visual elements of the first set of visual elements.

20. A method as described in claim 10, wherein said transforming comprises calculating, by the at least one computing device, the distance field representations as signed distance field versions of geometric parameters of the visual elements of the set of visual elements, the geometric parameters comprising one or more of visual element size, center location, or visual element rotation.

* * * * *

UNITED STATES PATENT AND TRADEMARK OFFICE
CERTIFICATE OF CORRECTION

PATENT NO. : 11,037,341 B1  
APPLICATION NO. : 16/744105  
DATED : June 15, 2021  
INVENTOR(S) : Giorgio Gori et al.

Page 1 of 1

It is certified that error appears in the above-identified patent and that said Letters Patent is hereby corrected as shown below:

In the Claims

Column 18, Line 62, in Claim 12, after "an", delete "affect".

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*